United States Patent
Phan

(10) Patent No.: US 7,788,685 B2
(45) Date of Patent: Aug. 31, 2010

(54) SOFTWARE RASP PARSER FOR A PVR-ENABLED SET-TOP SYSTEM

(75) Inventor: Kevin Thuan Phan, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 952 days.

(21) Appl. No.: 11/603,780

(22) Filed: Nov. 22, 2006

(65) Prior Publication Data

US 2008/0120678 A1 May 22, 2008

(51) Int. Cl.
*H04N 7/167* (2006.01)
(52) U.S. Cl. .............................. 725/31; 725/38; 725/54; 725/110; 725/114; 725/131
(58) Field of Classification Search ................... 725/38, 725/54, 110, 31, 114, 131; 386/67, 68, 83
See application file for complete search history.

(56) References Cited

U.S. PATENT DOCUMENTS 7,409,702 B2 * 8/2008 Cao ............................ 725/110

* cited by examiner

*Primary Examiner*—John W Miller
*Assistant Examiner*—Sumaiya A Chowdhury
(74) *Attorney, Agent, or Firm*—Farjami & Farjami LLP

(57) ABSTRACT

According to one aspect, there is provided a method for parsing RASP events in a number of packets in a PVR-enabled set-top system using a software RASP parser. The method includes retrieving a first SCID from a first packet, determining if the first SCID is on a SCIDList, and determining if the first packet is scrambled if the first SCID is on the SCIDList. The method further includes retrieving a second SCID from a second packet if the first SCID is not on the SCIDList. The method further includes determining if the first packet is an auxiliary packet if the first packet is not scrambled. The method further includes checking for a bundle boundary RASP event if the first packet is scrambled. The method further includes parsing the first packet for a scrambled RASP event if the first packet is scrambled.

18 Claims, 7 Drawing Sheets

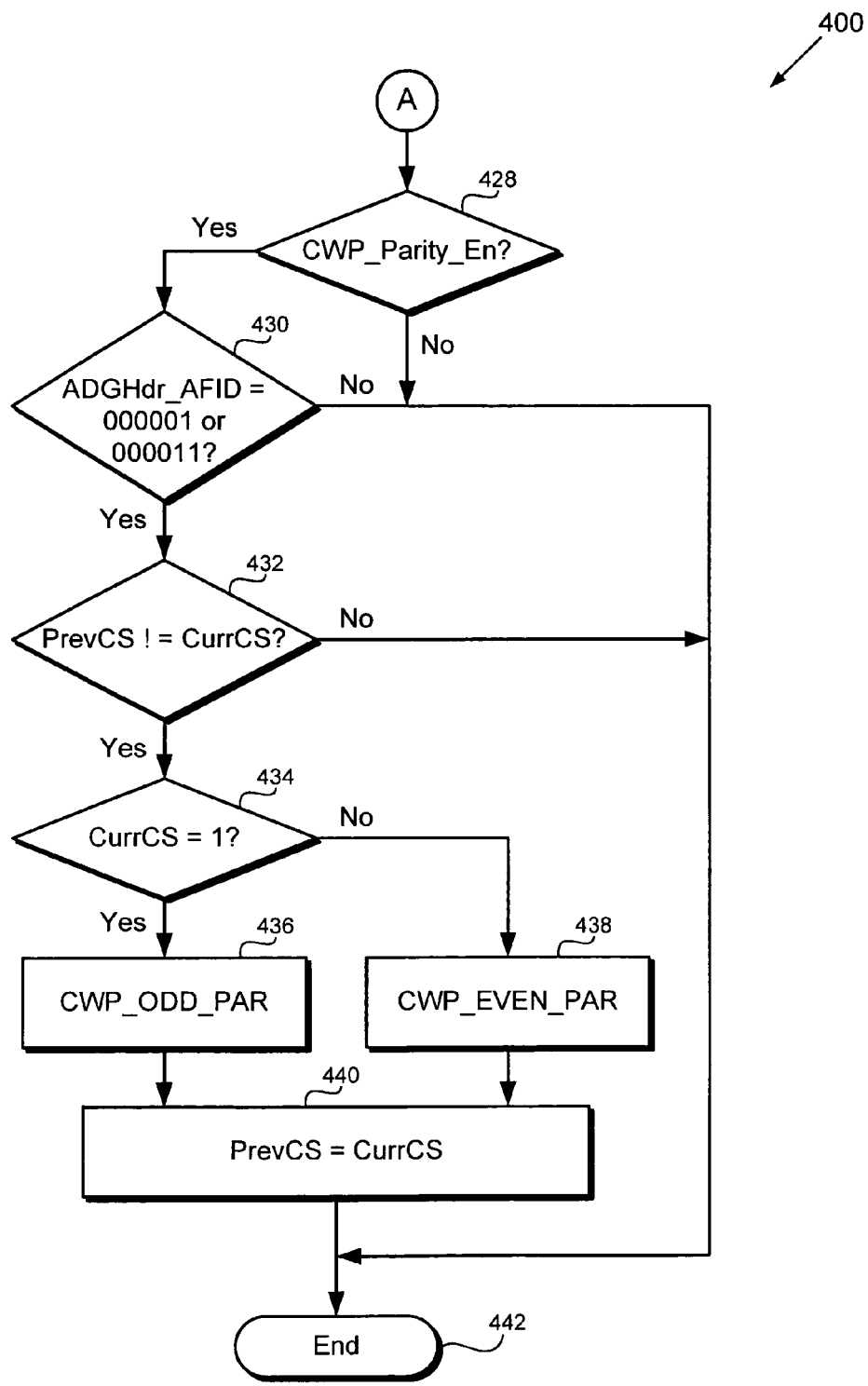

SOFTWARE RASP PARSER FOR A PVR-ENABLED SET-TOP SYSTEM

BACKGROUND OF THE INVENTION

1. Field of the Invention

The present invention is generally in the field of set-top systems. More specifically, the present invention is in the field of random access scrambled stream processing (RASP) parsers for personal video recorders in set-top systems.

2. Related Art

A Set-Top Box (STB) can include a Personal Video Recorder (PVR) for recording a TV program for later viewing. The STB can further include a Random Access Scrambled Stream Processing (RASP) module to provide access to encrypted TV programs that are recorded by the PVR. The RASP module can include a RASP parser, which can be implemented in a hardware device. The RASP parser can be configured to generate a table including indexes associated with particular access points in an encrypted TV program, which has been recorded on a hard disk in the STB. When the encrypted TV program is played back, the index table generated by the RASP parser can be utilized to allow the PVR to perform trick mode functions, such as fast forward and rewind, between the access points in the encrypted program.

To add features to the RASP parser or to accommodate changes that may occur in set-top technology or encrypted TV programming, the RASP parser may require modification. However, a conventional RASP parser typically cannot be easily or quickly modified.

SUMMARY OF THE INVENTION

A software RASP parser for a PVR-enabled set-top system, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIGS. 4A and 4B illustrates a portion of a flow diagram for parsing RASP events from an auxiliary packet according to one embodiment of the present invention.

DETAILED DESCRIPTION OF THE INVENTION

Figure 1:
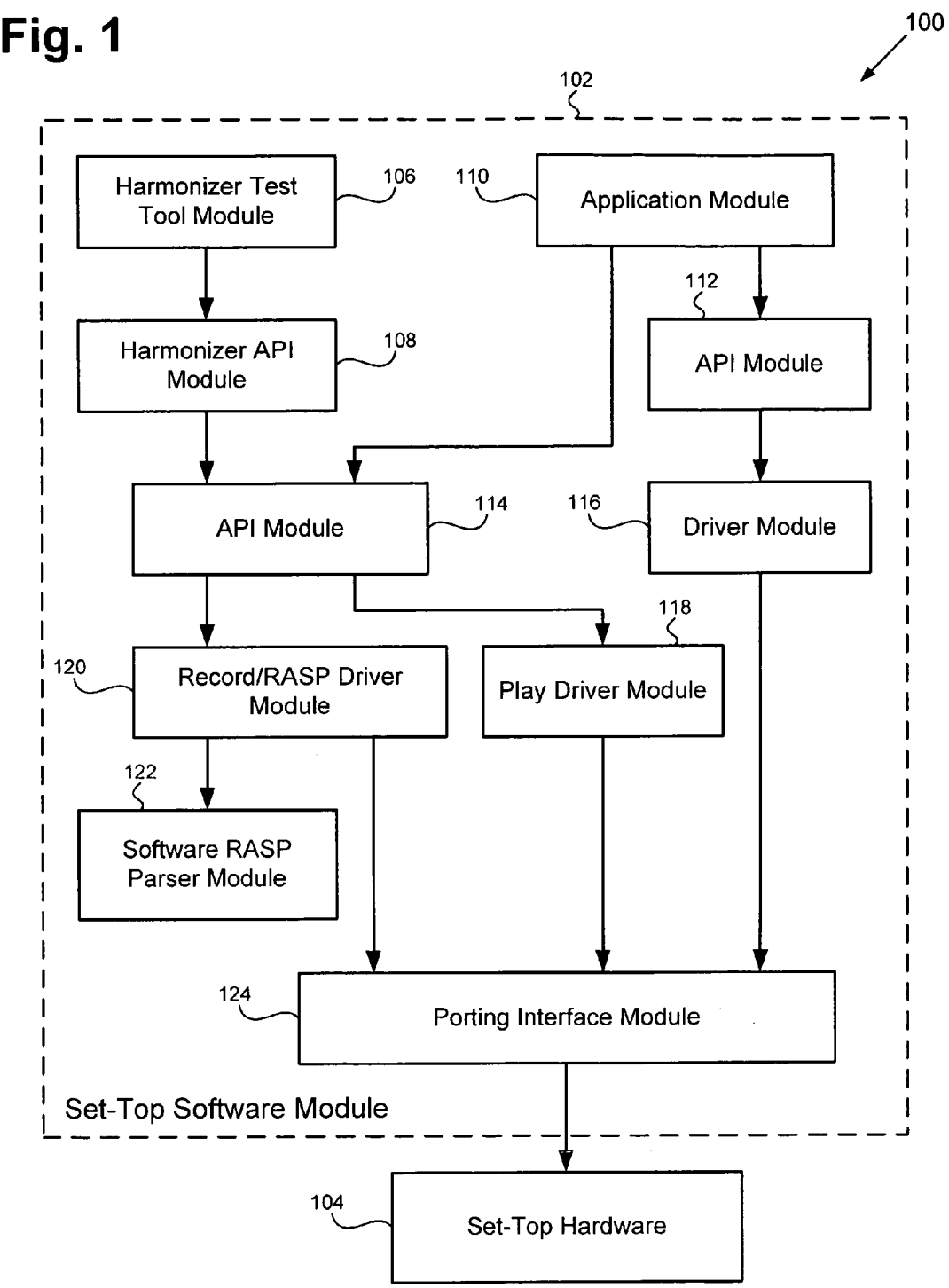
FIG. 1 illustrates a diagram of a PVR-enabled set-top system including a RASP parser module according to one embodiment of the present invention.

The present invention is directed to a software RASP parser for a PVR-enabled set-top system. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

FIG. 1 shows a diagram of an example PVR-enabled set-top system, according to one embodiment of the present invention. PVR-enabled Set-top system 100 includes set-top software module 102 and set-top hardware 104. Set-top software module 102 includes harmonizer test tool module 106, harmonizer API module 108, application module 110, application program interface (API) modules 112 and 114, driver module 116, play driver module 118, Record/RASP driver module 120, software RASP parser module 122, and porting interface module 124.

As shown in FIG. 1, harmonizer test tool module 106 is coupled to record/RASP driver module 120 and play driver module 118 via harmonizer API module 108 and API module 114. Harmonizer test tool module 106 provides enhanced TV test tools on a graphical user interface (GUI) to allow users to interactively test enhanced TV file systems, RASP events, and enhanced TV record and playback capabilities. Harmonizer API module 108 provides an interface to allow harmonizer test tool module 106 to communicate with API module 114, which provides an interface for communication with record/RASP driver module 120 and play driver module 118. API module 114 also provides a meta-indexer for generating meta-indexer files during enhanced TV mode program recording on a PVR, which can utilize a hard disk that can reside in set-top hardware 104. Record/RASP driver module 120 provides software for controlling the operation of the PVR in a record mode and play driver module 118 provides software for controlling the operation of the PVR in playback mode.

Also shown in FIG. 1, application module 110 is coupled to record/RASP driver module 120 and player driver module 118 via API module 114 and also coupled to driver module 116 via API module 112. Application module 110 provides applications for controlling the PVR, which is included in set-top hardware 104, in the enhanced TV mode and for controlling set-top hardware 104 in a non-enhanced TV mode. In the non-enhanced TV mode, API module 112 provides an interface to allow application module 110 to communicate with driver module 116 to control the operation of set-top hardware 104 in the non-enhanced TV mode.

Further shown in FIG. 1, Record/RASP drive module 120 is coupled to software RASP parser module 122 and porting interface module 124. Software RASP parser module 122 comprises a software RASP parser (not shown in FIG. 1), which can be configured to inspect and process RASP events from recorded packets. For example, the software RASP parser can inspect and process the RASP events after the packets are recorded into a memory buffer, which can reside in set-top hardware 104, and before saving the transport packets to the hard disk for playback at a later time. The RASP events, which can correspond to respective bits in a packet, can include bundle boundary, change of content to not scrambled, change of content to scrambling polarity 0, change of content to scrambling polarity 1, time code flag, RTS flag, AUX packet, modifiable flag, packet replacement, first packet in the recording, and internal RASP tick, for example.

The software RASP parser can be further configured to receive meta-indexer data from record/RASP driver module 120 and generate an index table (not shown in FIG. 1), which includes indexes associated with particular sections of a recorded enhanced TV program. The index table, which is generated by the software RASP parser, can be utilized by the PVR during program playback for performing trick mode functions, such as reverse and fast-forward. For example, the index table provided by the software RASP parser can be utilized by the PVR to fast-forward to a desired section of a recorded news program during program playback. The present invention's software RASP parser can be advantageously utilized as a substitute for a conventional RASP parser that is implemented in hardware. The operation of the invention's software RASP parser will be further discussed in relation to FIGS. 3A, 3B, 4A, 4B, and 5.

Also shown in FIG. 1, record/RASP driver module 120, play driver module 118, and driver module 116 are coupled to set-top hardware 104 via porting interface module 124. Porting interface module 124 provides an interface through which record/RASP driver module 120, play driver module 118, and driver module 116 can control set-top hardware 104. Set-top hardware 104 can include a hard disk, which can be utilized by the PVR to record TV programs and play back the recorded TV programs, and a processor, such as a microprocessor, for executing set-top software module 102. Set-top hardware 104 can also include other types of hardware devices, such as a memory device.

Figure 2:
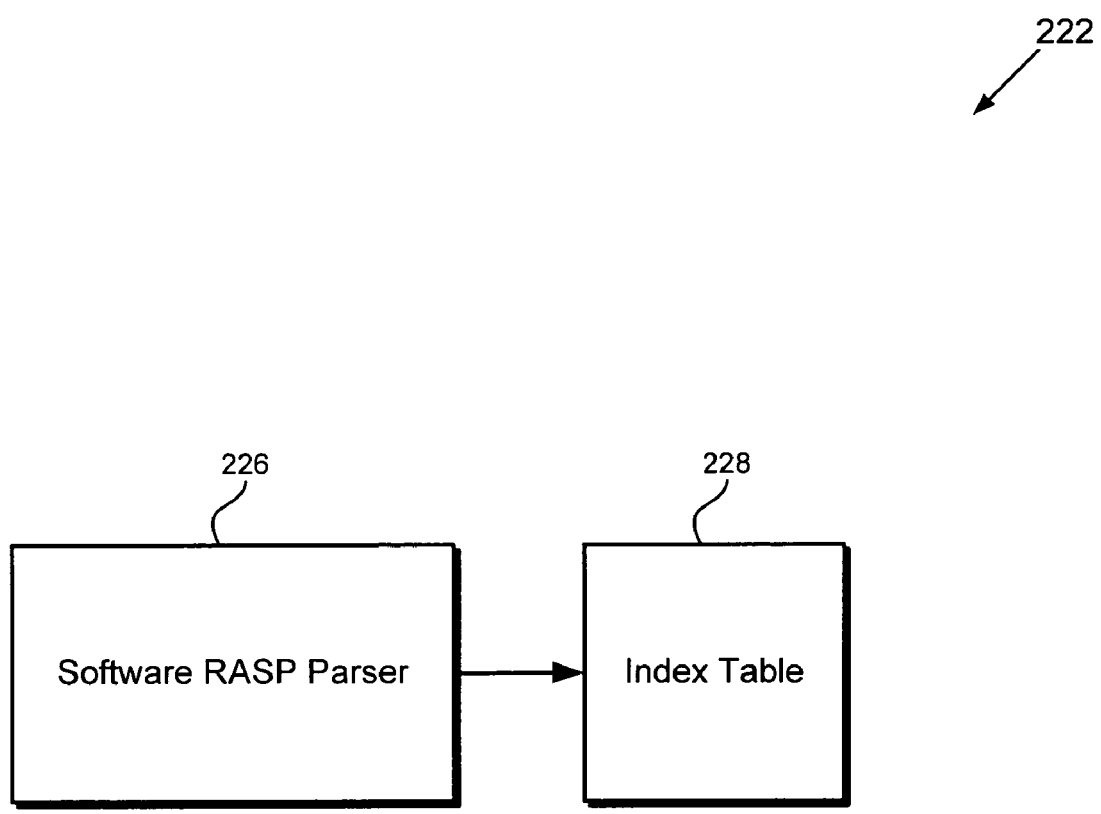
FIG. 2 illustrates a diagram of a RASP parser module including a software RASP parser according to one embodiment of the present invention.

FIG. 2 shows a diagram of an example software RASP parser module, according to one embodiment of the present invention. Software RASP parser module 222 in FIG. 2 corresponds to software RASP parser module 122 in FIG. 1 and includes software RASP parser 226 and index table 230. Software RASP parser 226 can be configured to inspect and process RASP events from recorded transport packets in a data stream received from record/RASP driver module 120 in FIG. 1, and generate index table 228, which can reside in the hard disk in the PVR. Index table 228 can include indexes associated with particular sections of a recorded enhanced TV program.

Figure 3A:
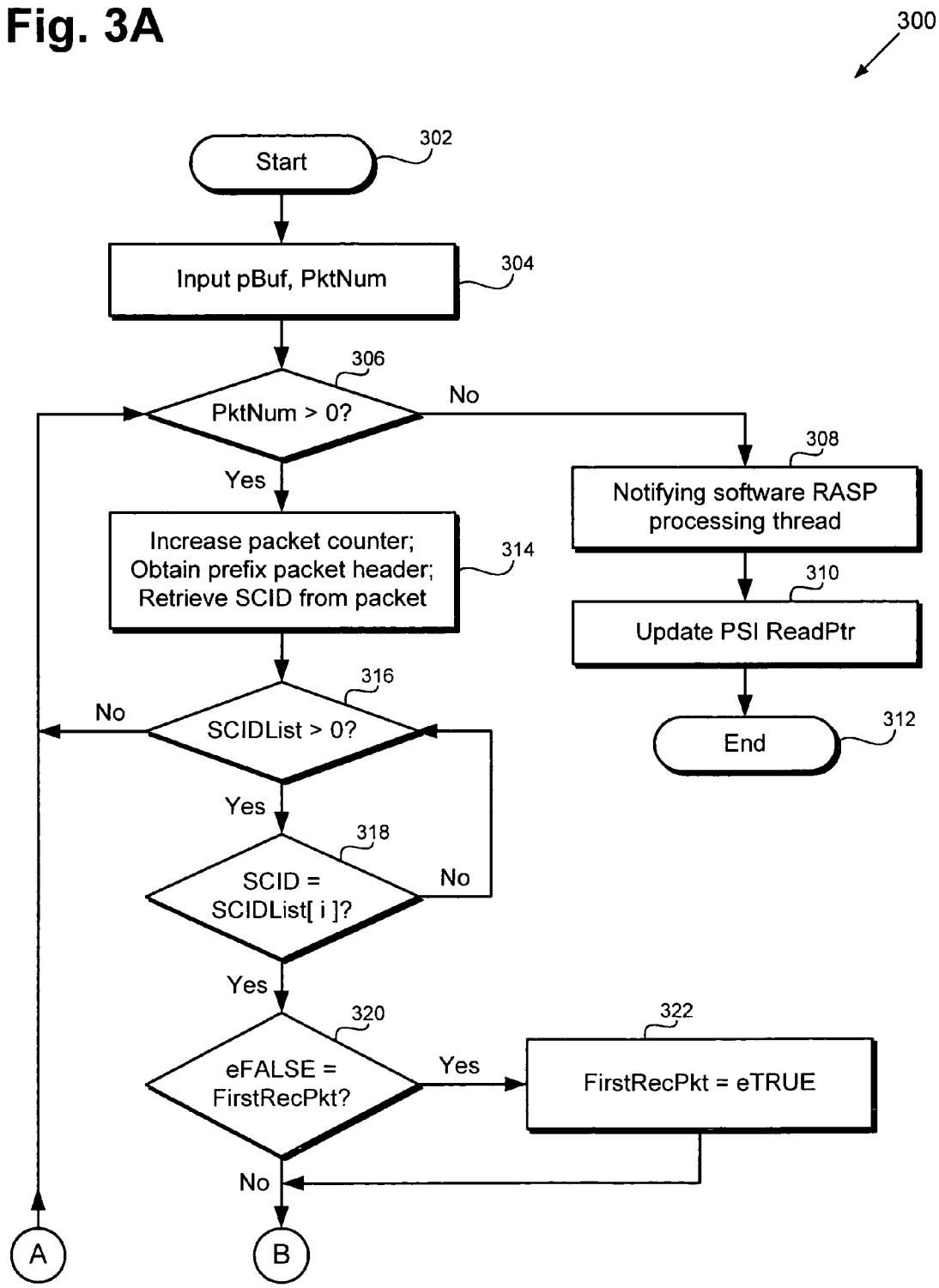
FIGS. 3A and 3B illustrate a flow diagram for parsing RASP events from transport packets according to one embodiment of the present invention.
Figure 3B:
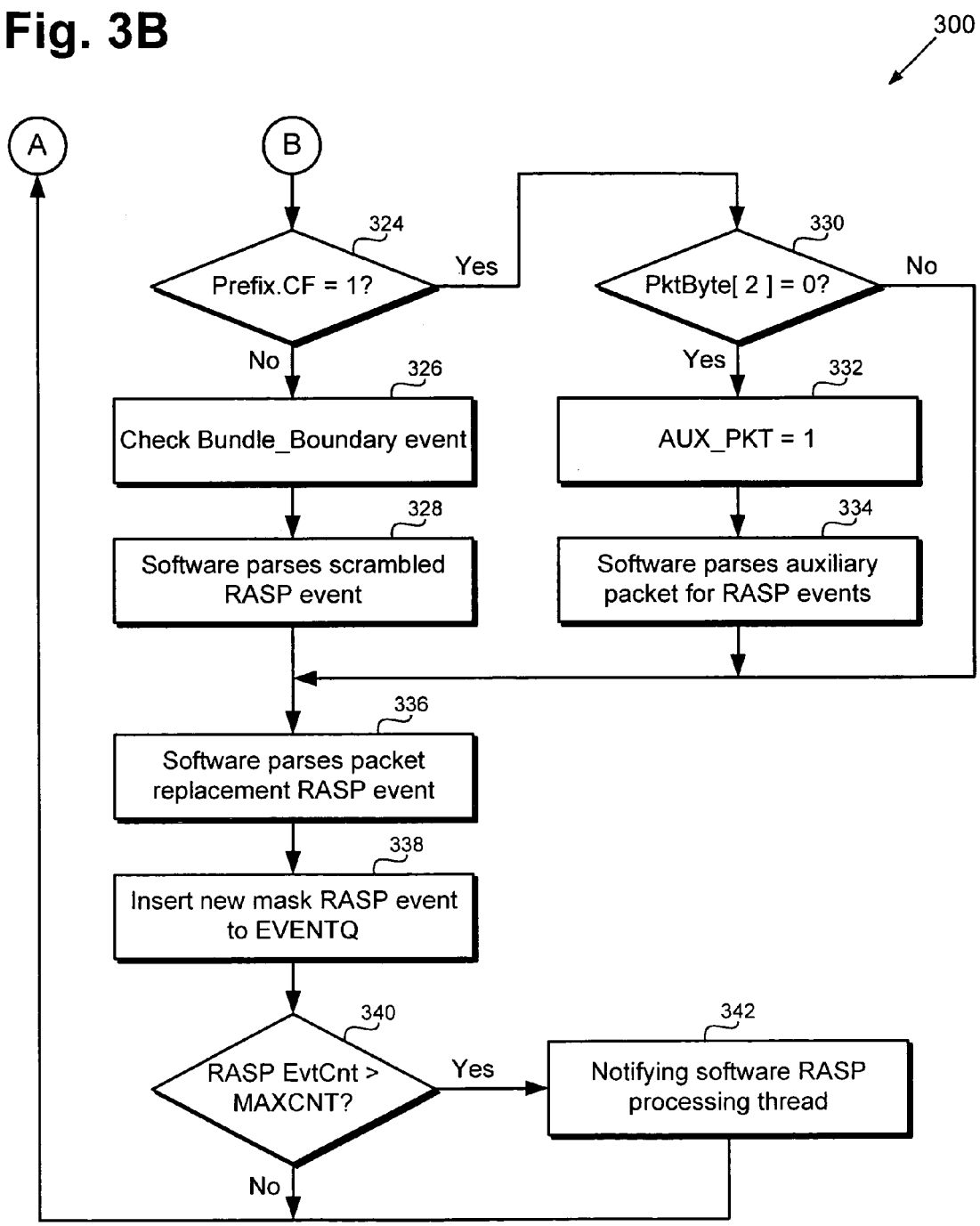

FIGS. 3A and 3B show flowchart 300 depicting a method for parsing RASP events by a software RASP parser, according to one embodiment of the present invention. Certain details and features have been left out of flowchart 300 of FIGS. 3A and 3B that are apparent to a person of ordinary skill in the art. For example, a step may consist of one or more sub-steps or may involve specialized equipment, as known in the art. While steps 302 through 342 shown in flowchart 300 are sufficient to describe one embodiment of the present invention, other embodiments of the invention may utilize steps different from those shown in flowchart 300. The RASP event parsing process in flowchart 300 can be performed, i.e., executed, by a processor, such as a microprocessor, which can reside in set-top hardware, such as set-top hardware 104 in FIG. 1.

The RASP event parsing process in flowchart 300 starts at step 302. Initially, a transport buffer, which can reside in set-top hardware, such as set-top hardware 104 in FIG. 1, can be provided with a number of packets for inputting into the invention's software RASP parser. At step 304, a number (PktNum) of packets are inputted into a packet buffer (pBuf) and a packet counter is set to 0. At step 306, the software RASP parser determines if PktNum (the number of packets in pBuf) is greater than 0. If PktNum is not greater than 0, flowchart 300 proceeds to step 308. At step 308, the software RASP parser triggers the "Notifying the software RASP processing thread" to send any event logs (from the input packets) to the RASP high level component. At step 310, the software RASP parser updates the PSI message read pointer (ReadPtr) for all SCID (packet identifier code) to insure that there are additional locations for subsequent packets. At step 312, the RASP event parsing process ends.

At step 306, if PktNum is greater than 0, flowchart 300 proceeds to step 314. At step 314, the software RASP parser increases the packet counter for the next packet, obtains a prefix packet header, and retrieves a SCID (packet identifier code) from the current packet. At step 316, the software RASP parser determines if SCIDList, which is a list of SCID that is configured for a particular record channel by enhanced TV middleware, is greater than 0. If SCIDList is greater than 0, flowchart 300 proceeds to step 318. At step 318, the software RASP parser compares the SCID from the current packet with each SCID in the SCIDList. If the SCID is not found in the SCIDList, i.e., SCIDList is equal to 0, flowchart 300 proceeds to step 306. If PktNum is greater than 0 at step 306, flowchart 300 proceeds to step 314, where the software RASP parser increases the packet counter and retrieves a SCID from the next packet. The process of comparing the current SCID with each SCID on the SCIDList to determine if the current SCID is on the SCIDList is repeated by the software RASP parser at step 318. If the current SCID is on the SCIDList, flowchart 300 proceeds to step 320.

At step 320, the software RASP parser determines if the current packet is the first recorded packet for this record channel. If the current packet is the first recorded packet for this record channel, flowchart 300 proceeds to step 322. At step 322, the software RASP parser marks the first record packet RASP event for this packet. At step 324, the software RASP parser checks the control flag (CF) bit for a clear network packet, i.e., an unscrambled packet. If CF=1, which indicates that the current packet is a clear network packet, flowchart 300 proceeds to step 330. At step 330, the software RASP parser checks the header designation (HD) and continuity counter (CC) to determine if this is an auxiliary packet. If CF=0 and HD=0, which indicates that the current packet is an auxiliary packet, flowchart 300 proceeds to step 332, where AUX_PKT is set to 1. If the current packet is not an auxiliary packet, flowchart 300 proceeds to step 336. At step 334, the software RASP parser parsers the auxiliary packet for RASP events.

At step 324, if CF=0, which indicates that the current packet is a scrambled packet, flowchart 300 proceeds to step 326. At step 326, the software RASP parser checks for the bundle boundary RASP event. At step 328, the software RASP parser parsers for the scramble parity change. The software RASP parser can also handle packet corruption and packet replacement. At step 336, the software RASP parser parsers for the packet replacement RASP event. The packet replacement or corruption is only applied to the recorded packets by the record hardware. At step 338, all RASP events in the packet can be masked together and saved in a circular queue of events (EVENTQ), which is initially created by the software RASP parser.

For any new RASP event that occurs in a packet, the software RASP parser selects an entry in the EVENTQ and stores the SCID, record packet number, record timer, RTS, and the RASP event mask for the packet into the EVENT data structure. After a number of entries are added, the software RASP parser triggers the "software RASP processing thread" to send all RASP events to the RASP high level component. The software RASP parser maintains the EVENTQ to avoid an overrun condition and out of synchronization access. No event log is saved for packets that do not contain a RASP event. The software RASP parser increases the event counter after an event log has been saved.

At step 340, the software RASP parser determines if the RASP event count (EvtCnt) is greater than a maximum count (MAXCNT). If EvtCnt is greater than MAXCNT, flowchart 300 proceeds to step 342. At step 342, the software RASP parser triggers the "Notifying the software RASP processing thread" to notify the RASP high level component. At step 340 if RASP EvtCnt is not greater than MAXCNT, flowchart 300 proceeds to step 306. The software RASP parser repeats the above process in flowchart 300 for the next recorded packet until all packets have been processed.

Figure 4A:
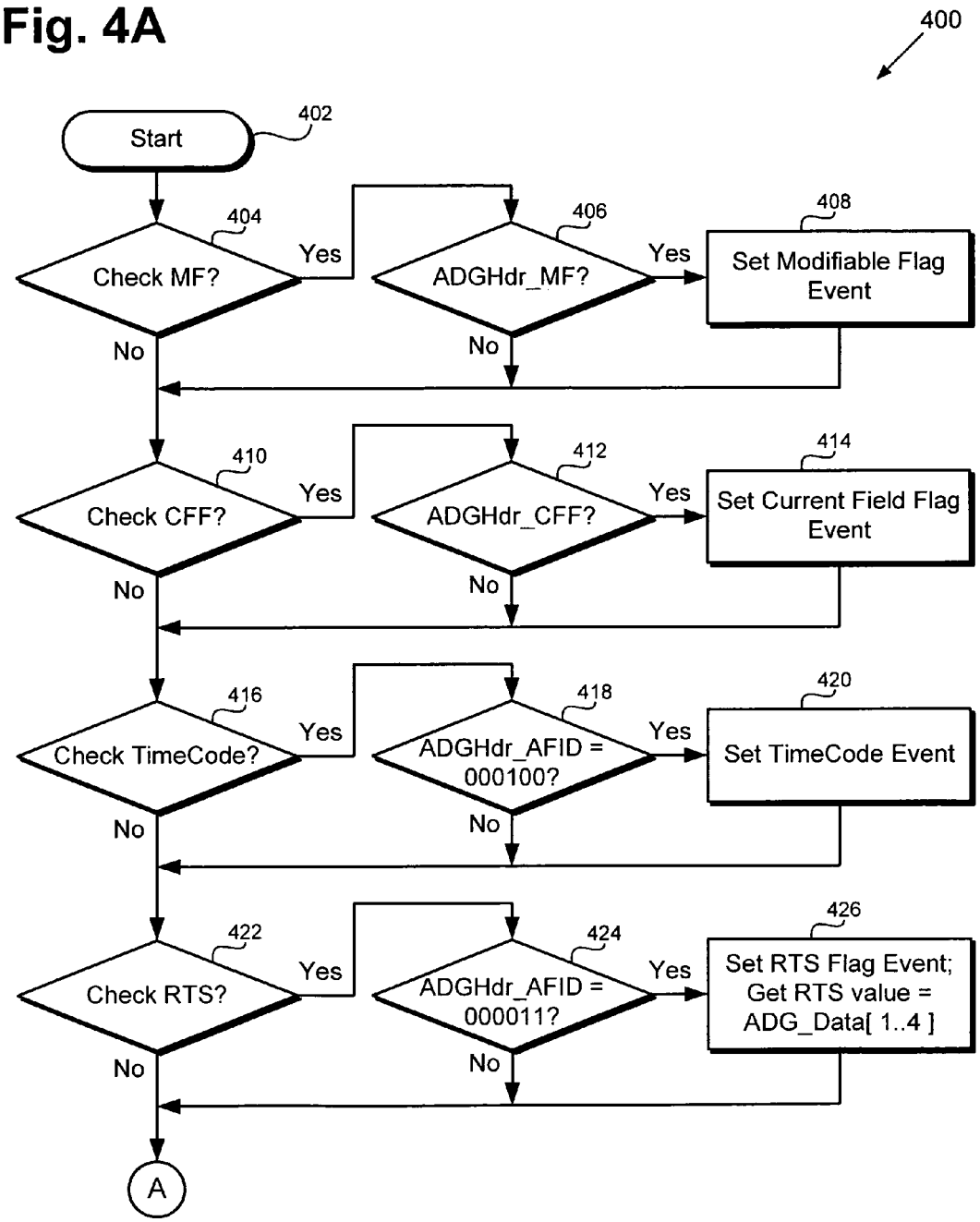

FIGS. 4A and 4B show flowchart 400 depicting a method for parsing RASP events from an auxiliary packet by a software RASP parser according to one embodiment of the present invention. Certain details and features have been left out of flowchart 400 of FIGS. 4A and 4B that are apparent to a person of ordinary skill in the art. For example, a step may consist of one or more sub-steps or may involve specialized equipment, as known in the art. While steps 402 through 442 shown in flowchart 400 are sufficient to describe one embodiment of the present invention, other embodiments of the invention may utilize steps different from those shown in flowchart 400. The RASP event parsing process in flowchart 400 can be executed by a processor, such as a microprocessor, which can reside, for example, in set-top hardware, such as set-top hardware 104 in FIG. 1.

The RASP event parsing process in flowchart 400 starts at step 402. When a packet is an auxiliary (AUX) packet, the software RASP parser sets the AUX Packet RASP event. When a packet is an AUX packet, the software RASP parser can parse for modifiable flag (MF), current field flag (CFF), time-code (TimeCode), and RTS flag RASP events. At step 404, the software RASP parser can check the MF bit in the AUX packet. If the software RASP parser checks the MF, flowchart 400 proceeds to step 406. At step 406, the software RASP parser determines if the MF in the auxiliary data group header (ADGHdr_MF) is set. If ADGHdr_MF is set, flowchart 400 proceeds to step 408. At step 408, the software RASP parser sets the modifiable flag RASP event. If the software RASP parser does not check the MF at step 404 or if ADGHdr_MF is not set at step 406, flowchart 400 proceeds to step 410.

At step 410, the software RASP parser can check the CFF in the AUX packet. If the software RASP parser checks the CFF in the AUX packet, flowchart 400 proceeds to step 412. At step 412, the software RASP parser determines if ADGHdr_CFF is set. If ADGHdr_CFF is set, flowchart 400 proceeds to step 414. At step 414, the software RASP parser sets the current field flag RASP event. If the software RASP parser does not check the CFF at step 410 or if ADGHdr_CFF is not set at step 412, flowchart 400 proceeds to step 416. At step 416, the software RASP parser can check the TimeCode in the AUX packet. If the software RASP parser checks TimeCode, flowchart 400 proceeds to step 418. At step 418, the software RASP parser determines if ADGHdr_AFID is equal to 000100. If ADGHdr_AFID is equal to 000100, flowchart 400 proceeds to step 420. At step 420, the software RASP parser sets the TimeCode RASP event. If the software RASP parser does not check the TimeCode at step 416 or if ADGHdr_AFID is not equal to 000100 at step 418, flowchart 400 proceeds to step 422.

At step 422, the software RASP parser can check the RTS flag in the AUX packet. If the software RASP parser checks the RTS flag, flowchart 400 proceeds to step 424. At step 424, the software RASP parser determines if ADGHdr_AFID is equal to 000011. If ADGHdr_AFID is equal to 000011, flowchart 400 proceeds to step 426. At step 426, the software RASP parser sets the RTS flag RASP event and extracts the first 5 bytes of the auxiliary data block for the RTS value and stores it in the 32-bit RTS while ignoring the first byte. For example, the RTS format can be as follows: RTS value=ADG_Data [1]|(ADG_Data [4]<<8)|(ADG_Data [3]<<16)|(ADG_Data [3]<<24). If the software RASP parser does not check the RTS flag at step 422 or if ADGHdr_AFID is not equal to 000011 at step 424, flowchart 400 proceeds to step 428.

At step 428, the software RASP parser determines if the control word packet (CWP) parity is enabled. If the CWP is enabled, flowchart 400 proceeds to step 430. At step 430, the software RASP parser determines if ADGHdr_AFID is equal to 000001 or 000011. If ADGHdr_AFID is equal to 000001 or 000011, flowchart 400 proceeds to step 432. If the software RASP parser determines that CWP parity is not enabled at step 428 or if ADGHdr_AFID is not equal to 000001 or 000011 at step 430, flowchart 400 proceeds to step 442, where the process ends. At step 432, the software RASP parser determines if previous control sync (PrevCS) value is not equal to current control sync (CurrCS) value. If the PrevCS value is not equal to the CurrCS value, flowchart 400 proceeds to step 434. If the PrevCS value is equal to the CurrCs value, flowchart 400 proceeds to step 442, where the process ends.

At step 434, the software RASP parser determines if the CurrCS value is equal to 1. If the CurrCS value is equal to 1, flowchart 400 proceeds to step 436. At step 436, the software RASP parser sets CWP parity to odd parity (CWP_ODD_PAR). At step 434, if the CurrCS value is not equal to 1, flowchart 400 proceeds to step 438. At step 438, the software RASP parser sets CWP parity to even parity (CWP_EVEN_PAR). At step 440, the software RASP parser sets the PrevCS value to be equal to the CurrCS value. At step 442, the method of parsing RASP events from an auxiliary packet by the software RASP parser ends.

Figure 5:
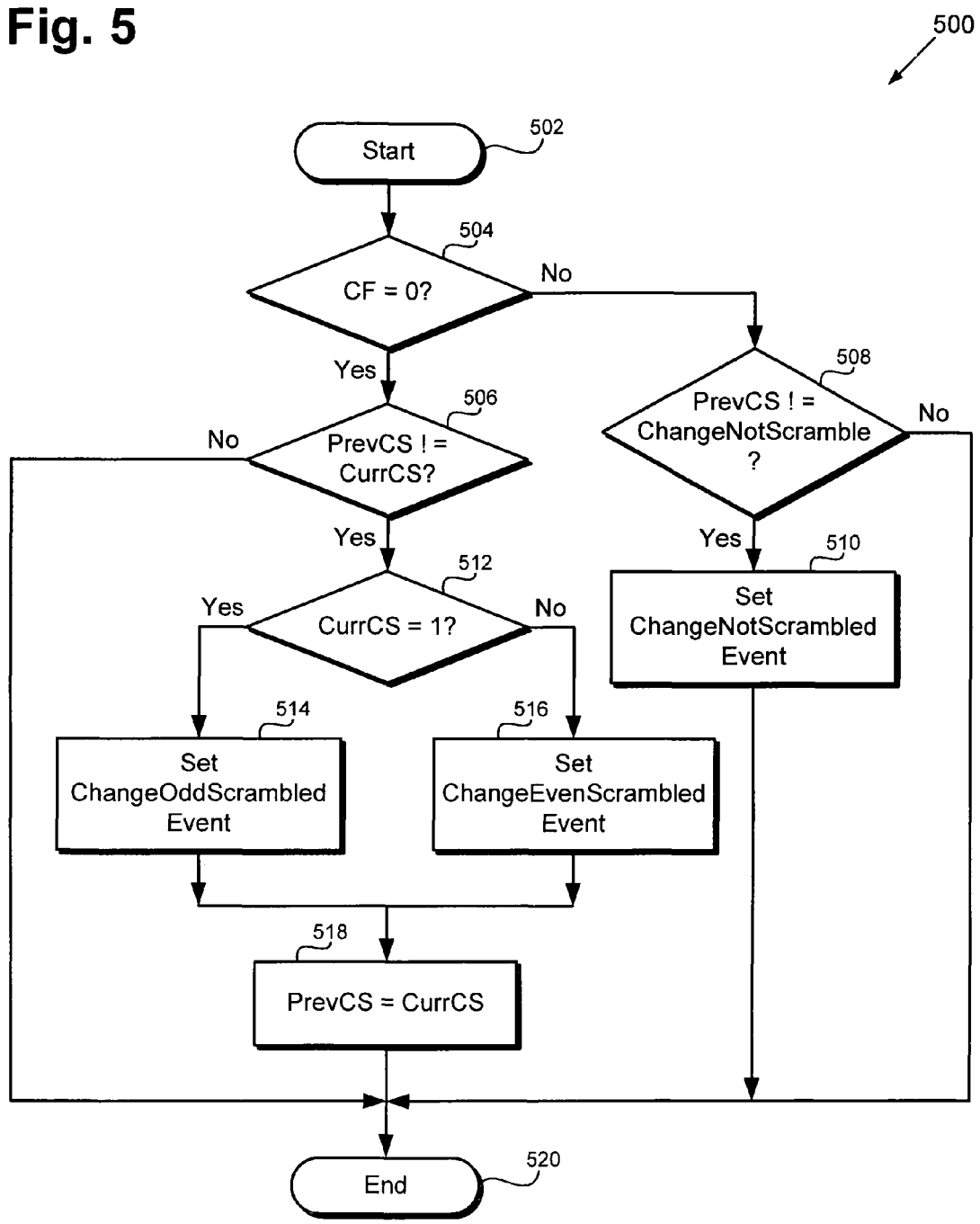
FIG. 5 illustrates a flow diagram for parsing a scrambled parity change RASP event according to one embodiment of the present invention.

FIG. 5 shows flowchart 500 depicting a method for parsing a scrambled parity change RASP event by a software RASP parser according to one embodiment of the present invention. Certain details and features have been left out of flowchart 500 of FIG. 5 that are apparent to a person of ordinary skill in the art. For example, a step may consist of one or more sub-steps or may involve specialized equipment, as known in the art. While steps 502 through 520 shown in flowchart 500 are sufficient to describe one embodiment of the present invention, other embodiments of the invention may utilize steps different from those shown in flowchart 500. The RASP event parsing process in flowchart 500 can be executed by a processor, such as a microprocessor, which can reside, for example, in set-top hardware, such as set-top hardware 104 in FIG. 1.

The RASP event parsing process in flowchart 500 starts at step 502. At step 504, the software RASP parser checks the control flag (CF) bit in a packet header to determine if it is a scrambled packet. For example, the packet can be a DirecTV packet. If CF is equal to 0, which indicates that the packet is a scrambled packet, the software RASP parser obtains the CurrCS (current control sync) value and flowchart 500 proceeds to step 506. If CF is not equal to 0, the software RASP parser obtains the CurrCS value and flowchart 500 proceeds to step 508. At step 508, the software RASP parser compares the CurrCS value with the PrevCS (previous CS) value. If the CurrCS value and the PrevCS value are different, flowchart 500 proceeds to step 510. At step 510, the software RASP parser sets the "change to not scrambled" RASP event. If the CurrCS value is equal to the PrevCS value, flowchart 500 proceeds to step 520, where the process ends.

At step 506, the software RASP parser compares the CurrCS value with the PrevCS value. A difference between the CurrCS value and the PrevCS value indicates a scrambled parity change in the packet. If the CurrCS value is different than the PrevCS value, flowchart 500 proceeds to step 512. If the CurrCS value is equal to the PrevCS value, flowchart 500 proceeds to step 520, where the process ends. At step 512, the software RASP parser determines if the CurrCS value is equal to 1. If the CurrCS value is equal to 1, which indicates an odd scrambled parity change in the packet, flowchart 500 proceeds to step 514. At step 514, the software RASP parser sets the "scrambled parity change odd" RASP event. If the CurrCS value is not equal to 1, which indicates an even scrambled parity change in the packet, flow chart 500 proceeds to step 516. At step 516, the software RASP parser sets the "scrambled parity change even" RASP event. At step 520, the process ends.

Thus, as discussed above, the present invention advantageously achieves a software RASP parser for parsing RASP events in a PVR-enabled set-top system. The invention also advantageously achieves a software RASP parser that can be more easily updated and modified compared to a conventional RASP parser that is implemented in hardware.

The present invention may be embodied in other specific forms without departing from its spirit or essential characteristics. The described embodiments are to be considered in all respects only as illustrative and not restrictive. Those skilled in the art will recognize that changes and modifications may be made to the embodiments without departing from the scope of the present invention. These and other changes or modifications are intended to be included within the scope of present invention, as broadly described herein.

What is claimed is:

1. A method for parsing RASP events in a plurality of packets in a PVR-enabled set-top system using a software RASP parser, said method comprising:
    retrieving a first SCID from a first packet of said plurality of packets;
    determining if said first SCID is on a SCIDList;
    determining if said first packet is scrambled if said first SCID is on said SCIDList;
    parsing said first packet for a scrambled RASP event if said first packet is scrambled;
    generating an index table using the scrambled RASP event; and
    storing said index table in a memory of said PVR-enabled set-top system;
    wherein the index table includes indexes associated with particular sections of a recorded program, wherein said indexes are capable of being utilized to allow the PVR-enabled set-top system to perform trick mode functions, including fast forward and rewind of said recorded program.

2. The method of claim 1, further comprising retrieving a second SCID from a second packet of said plurality of packets if said first SCID is not on said SCIDList.

3. The method of claim 1, further comprising determining if said first packet is auxiliary packet if said first packet is not scrambled.

4. The method of claim 3, further comprising parsing said first packet for RASP events if said first packet is said auxiliary packet.

5. The method of claim 4, wherein said parsing said first packet for RASP events comprises parsing said first packet for modifiable flag, current field flag, time-code, and RTS flag if said first packet is said auxiliary packet.

6. The method of claim 1, further comprising checking for a bundle boundary RASP event if said first packet is scrambled.

7. The method of claim 1, further comprising saving all RASP events in said first packet in an event queue.

8. The method of claim 1, further comprising:
    obtaining a current control sync value if said first packet is scrambled; and
    determining if said current control sync value is different than a previous control sync value.

9. The method of claim 8, determining a scrambled parity change in said first packet if said current control sync value is different than said previous control sync value.

10. A PVR-enabled set-top system comprising:
    a memory; and
    a set-top software module including:
        a software RASP parser for parsing RASP events in a plurality of packets in an input buffer in said PVR-enabled set-top system;
        wherein said software RASP parser is configured to:
            retrieve a first SCID from a first packet of said plurality of packets;
            determine if said first SCID is on a SCIDList;
            determine if said first packet is scrambled if said first SCID is on said SCIDList;
            parse said first packet for a scrambled RASP event if said first packet is scrambled;
            generate an index table using the scrambled RASP event; and
            store said index table in said memory of said PVR-enabled set-top system;
            wherein the index table includes indexes associated with particular sections of a recorded program, wherein said indexes are capable of being utilized to allow the PVR-enabled set-top system to perform trick mode functions, including fast forward and rewind of said recorded program.

11. The set-top software module of claim 10, wherein said software RASP parser is further configured to retrieve a second SCID from a second packet of said plurality of packets if said first SCID is not on said SCIDList.

12. The set-top software module of claim 10, wherein said software RASP parser is further configured to determine if said first packet is an auxiliary packet if said first packet is not scrambled.

13. The set-top software module of claim 12, wherein said software RASP parser is further configured to parse said first packet for RASP events if said first packet is said auxiliary packet.

14. The set-top software module of claim 13, wherein RASP events comprise a modifiable flag, current field flag, time-code, and RTS flag.

15. The set-top software module of claim 10, wherein said software RASP parser is further configured to check fbr a bundle boundary RASP event if said first packet is scrambled.

16. The set-top software module of claim 10, wherein said software RASP parser is further configured to save all RASP events in said first packet in an event queue.

17. The set-top software module of claim 10, wherein said software RASP parser is further configured to obtain a current control sync value if said first packet is scrambled, determine if said current control sync value is different than a previous control sync value, and determine a scrambled parity change in said first packet if said current control sync value is different than said previous control sync value.

18. The set-top software module of claim 10, wherein said software RASP parser is executed by a processor in said PVR-enabled set-top system.

* * * * *

UNITED STATES PATENT AND TRADEMARK OFFICE
CERTIFICATE OF CORRECTION

| | |
|---|---|
| PATENT NO. | : 7,788,685 B2 |
| APPLICATION NO. | : 11/603780 |
| DATED | : August 31, 2010 |
| INVENTOR(S) | : Kevin Thuan Phan |

Page 1 of 1

It is certified that error appears in the above-identified patent and that said Letters Patent is hereby corrected as shown below:

In the claims, column 8, line 51, "fbr" should be changed to --for--.

Signed and Sealed this
Twenty-second Day of March, 2011

David J. Kappos
*Director of the United States Patent and Trademark Office*